United States Patent [19]
Jarboe et al.

[11] Patent Number: 5,447,327
[45] Date of Patent: Sep. 5, 1995

[54] ARRANGEMENT FOR PROVIDING AN AIR BAG DEPLOYMENT OPENING

[75] Inventors: Patrick G. Jarboe, Shelby Township, Utica County; Jeffery L. Scharret, Rochester Hills; Tae Y. Kwak, White Lake; Steven R. Fredin, Ortonville, all of Mich.

[73] Assignee: Morton International, Inc., Chicago, Ill.

[21] Appl. No.: 248,943

[22] Filed: May 25, 1994

[51] Int. Cl.⁶ .................................. B60R 21/20
[52] U.S. Cl. ............................. 280/728.3; 280/732
[58] Field of Search ............ 280/728 B, 732, 752, 280/728 R, 728 A, 730 R; 180/90

[56] References Cited

U.S. PATENT DOCUMENTS

| | | | |
|---|---|---|---|
| 3,622,176 | 11/1971 | Byer | 280/732 |
| 3,640,546 | 2/1972 | Brawn | 280/732 |
| 3,794,349 | 2/1974 | Fuller | 280/732 |
| 3,904,222 | 9/1975 | Bursott et al. | 280/732 |
| 4,120,516 | 10/1978 | Takamatsu et al. | 280/728 B |
| 4,773,673 | 9/1988 | Sakurai | 280/732 |
| 4,964,653 | 10/1990 | Parker | 280/728 B |
| 5,072,967 | 12/1991 | Batchelder et al. | 280/732 |
| 5,082,310 | 1/1992 | Bauer | 280/732 |
| 5,096,221 | 3/1992 | Combs et al. | 280/732 |
| 5,110,647 | 5/1992 | Sawada et al. | 428/43 |
| 5,116,079 | 5/1992 | Rhodes, Jr. | 280/728 B |
| 5,172,931 | 12/1992 | Baba et al. | 280/728 B |
| 5,186,492 | 2/1993 | Wright et al. | 280/732 |
| 5,222,760 | 6/1993 | Rafferty | 280/728 B |
| 5,238,264 | 8/1993 | Barnes | 280/732 |
| 5,248,532 | 9/1993 | Sawada et al. | 428/35.2 |
| 5,308,111 | 5/1994 | Sommer | 280/728 B |

FOREIGN PATENT DOCUMENTS

| | | | |
|---|---|---|---|
| 5004558 | 1/1993 | Japan | 280/728 A |
| 5131888 | 5/1993 | Japan | 280/728 B |
| 5162603 | 6/1993 | Japan | 280/728 B |
| 5229367 | 9/1993 | Japan | 280/728 B |

*Primary Examiner*—Mitchell J. Hill
*Assistant Examiner*—Peter C. English
*Attorney, Agent, or Firm*—Nick C. Kottis; Gerald K. White

[57] ABSTRACT

An arrangement for providing an opening in an interior trim structure of an automotive vehicle for the deployment of an air bag therethrough which minimizes the visual and/or tactile impression of the presence of the closure and the air bag deployment opening thereunder and which is not susceptible to significant fragmentation and projection of such fragments into the passenger compartment upon the opening thereof.

13 Claims, 4 Drawing Sheets

ARRANGEMENT FOR PROVIDING AN AIR BAG DEPLOYMENT OPENING

BACKGROUND OF THE INVENTION

This invention relates generally to inflatable passive restraint systems for use in vehicles for restraining the movement of a seated occupant during a collision and, more particularly, to an arrangement for providing an opening in an interior trim structure of an automotive vehicle for the deployment of an air bag therethrough.

Safety restraint systems which self-actuate from an undeployed to a deployed state without the need for intervention by the operator, i.e., "passive restraint systems", and particularly those restraint systems incorporating inflatable bags or cushions (commonly referred to as "air bags") have been devised for automotive vehicles. In such systems, one or more air bags are stowed in respective storage areas within the passenger compartment of the vehicle. Upon actuation, the one or more air bags are deployed out into the vehicle passenger compartment through a respective opening or openings in the vehicle interior.

Vehicular inflatable restraint systems generally include multiple crash sensors generally positioned about or mounted to the frame and/or body of the subject vehicle and serve to sense sudden decelerations by the vehicle. Upon detection of a sudden deceleration, such as in a collision, the air bag or air bags are rapidly inflated and deployed in positions to cushion the driver and/or passengers from injury-causing contact with the interior structure of the vehicle.

In general, an air bag provided for the protection of a vehicle driver, i.e., a driver side air bag, is mounted in a storage compartment located in the steering column of the vehicle. Whereas, an air bag for the protection of a front seat passenger, i.e., a passenger side air bag, is typically mounted in a storage compartment behind the instrument panel/dashboard of the vehicle. Such air bags are normally housed in an uninflated and folded condition to minimize space requirements.

Such air bags are generally stowed out of sight, thereby reducing the potential for intentional and unintentional tampering therewith. In the normal operation of the vehicle, prior to deployment of the air bag, a closure or some form of closure member covers the opening wherethrough, upon actuation, the air bag is deployed. Consequently, the closure is of necessity generally exposed within the interior of the vehicle.

The interior trim structure of vehicles, particularly the trim panel also referred to as the instrument panel or dashboard, wherein the opening for air bag deployment is often desirably located and in which the closer for this opening is situated, is commonly comprised of several layers including a substrate, an overlying foam padding material, and a skin covering.

In the interest of minimizing the visual (i.e., "look") and tactile (i.e., "feel") impressions of the presence of the deployment closure/door and the opening associated therewith, it has been generally desired that the closure/door be designed to match or otherwise be compatible with the interior design of the vehicle. Unfortunately, due largely to the mechanics normally associated with closure design and operation, it is frequently difficult to closely match the look and feel of the instrument panel and other trim panel surfaces to the desired extent.

Upon actuation, the closures are typically opened as a result of the force exerted thereon by way of the air bag inflating thereagainst. In practice, it is generally desired that deployment of the inflating air bag not be appreciably slowed by resistance of the closure to opening. That is, the closure permits the near instantaneous deployment of the air bag into the passenger compartment.

Thus, the air bag deployment process is of necessity a very rapid process and, at least partially as a result thereof, commonly results in the door or doors opening with a large amount of force and energy. The rapidity of the deployment process, if not fully accounted for in the system design, can result in the closure tearing in an undesired and/or uncontrolled manner. Undesired and/or uncontrolled tearing of the closure in turn can result in the closure breaking into or forming separate pieces which can then act as projectiles which would be capable of damaging or hurting vehicle occupants. Fragmentation associated with closure opening can be especially pronounced with respect to foam padding material from the trim structure in the area adjacent the air bag deployment opening. Additionally, the inclusion of a layer of foam padding in a closure itself, so as to approximate the feel provided by the foam of the trim structure, can prove troublesome as the opening of such a closure could result in fragmentation of the closure foam material.

Thus, the need exists for an efficient and economical arrangement for providing an opening in an interior trim structure of an automotive vehicle for the deployment of an air bag therethrough. Preferably, such an arrangement minimizes the visual and/or tactile impression of the presence of the closure and both the air bag deployment opening and air bag thereunder and does not result in significant fragmentation and projection of such fragments into the passenger compartment upon the opening thereof.

SUMMARY OF THE INVENTION

A general object of the invention is to provide an improved arrangement for providing an opening in an interior trim structure of an automotive vehicle for the deployment of an air bag therethrough.

A more specific objective of the invention is to overcome one or more of the problems described above.

The general object of the invention can be attained, at least in part, through an arrangement for providing an opening in an interior trim structure of an automotive vehicle for the deployment of an air bag therethrough. The interior trim structure of the vehicle includes a substrate section and a foam section, with the foam section at least partially overlying the substrate section.

In a first embodiment, the arrangement includes: at least one door panel including a substrate portion and a skin smoothly overlaying the trim structure foam section and the door substrate portion. The door panel provides closure to the opening prior to deployment of the air bag with the skin fastened to the door substrate portion.

The invention further comprehends a second embodiment wherein the arrangement includes: at least one door panel including a substrate portion and a skin smoothly overlaying the interior trim structure and the door panel. The door panel provides closure to the air bag deployment opening prior to air bag deployment. The skin has a side proximate to the interior trim structure foam section and the door panel. The skin includes at least one integral flange extending from the proximate side adjacent the periphery of the door panel. The flange is joined to the interior trim substrate section. The interior trim structure foam section includes foam injection molded between the skin and the interior trim structure substrate. The flange prevents passage of the interior trim structure injected foam onto the door panel substrate portion.

The invention still further comprehends yet another embodiment of an arrangement for providing an opening in an interior trim structure of an automotive vehicle for the deployment of an air bag therethrough. In this embodiment, the arrangement includes at least one door panel providing closure to the air bag deployment opening prior to air bag deployment. The door panel includes a substrate portion and a foam layer portion at least partially lying over and on the door panel substrate portion. The door panel foam layer portion and the door panel substrate portion each having at least a first, a second, and a third side. The first side of the door panel foam layer portion is continuous with the interior trim structure foam section. At least the second and third sides of the door panel substrate portion are non-continuous with the interior trim structure substrate section. Also, at least the second and third sides of the door panel foam layer portion are non-continuous with the interior trim structure foam section. The first side of the door panel form a hinge to enable the door panel to hinge open and form the air bag deployment opening.

The arrangement also includes a skin smoothly overlaying the interior trim structure foam section and the door panel foam layer portion. The skin is adhered to the door panel substrate portion at least at the second and third sides of the door panel.

The prior art fails to provide sufficiently efficient and economical arrangements for providing an opening in an interior trim structure of an automotive vehicle for the deployment of an air bag therethrough. Also, the prior art arrangements fail to minimize the visual and/or tactile impression of the presence of the closure and both the air bag deployment opening and air bag thereunder to the extent desired. Further, such prior art arrangements can be susceptible to significant fragmentation and projection of such fragments into the passenger compartment upon the opening thereof.

Other objects and advantages will be apparent to those skilled in the art from the following detailed description taken in conjunction with the appended claims and drawings.

As used herein, references to a feature or characteristic as being "integral" or the like to an element or component are to be understood to refer to that feature or characteristic being formed and included therein during the initial formation of the respective element or component. For example, for an injection molded element or component, an integral feature or characteristic is one that is formed therein during the molding process. That is, such a feature or characteristic is typically reflected in the tooling used to mold the part, e.g., in the mold die, as opposed to requiring a secondary operation wherein a previously formed part is processed, such as with a cutting blade, to form the specified feature or characteristic.

DETAILED DESCRIPTION OF THE INVENTION

The present invention, as is described in more detail below, provides an improved arrangement for providing an opening in an interior trim structure of an automotive vehicle for the deployment of an air bag therethrough.

While the invention is described hereinafter with particular reference to a passenger side air bag assembly for automotive vehicles including vans, pick-up trucks, and particularly automobiles, it is to be understood that the invention also has applicability with other types or kinds of air bag assemblies including driver side air bag assemblies.

Further, while the invention is described hereinafter with particular reference to single door arrangements for providing an opening in an interior trim structure of an automotive vehicle for the deployment of an air bag therethrough, it is to be understood that the invention can also be practiced with arrangements wherein two or more doors are formed.

Figure 1:
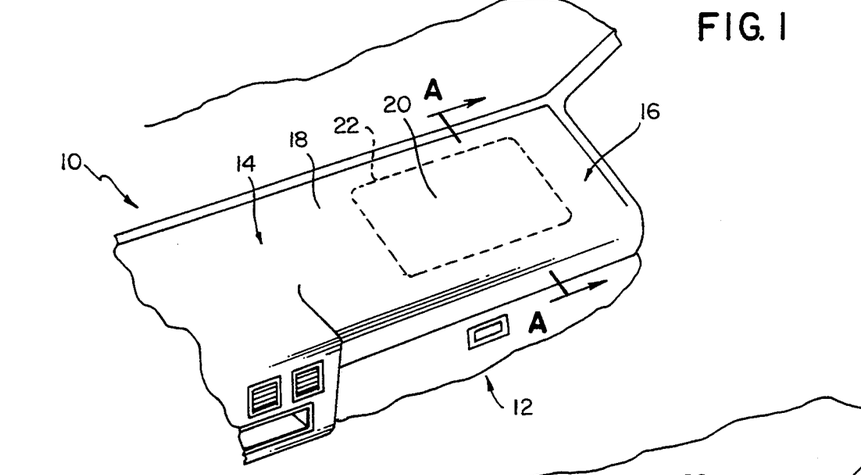
FIG. 1 is a simplified fragmentary perspective view of a vehicle interior incorporating an arrangement of an air bag deployment opening in accordance with the invention.
Figure 2:
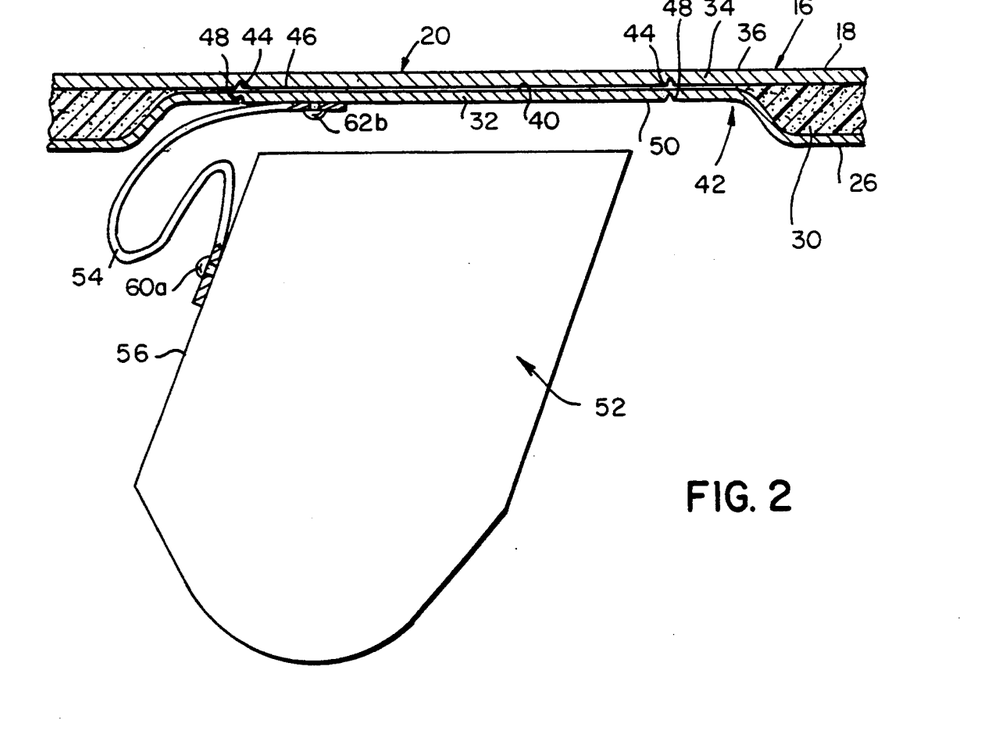
FIG. 2 is an enlarged simplified fragmentary cross sectional view taken substantially along the line A—A of FIG. 1 and viewed in the direction of the arrows, illustrating an embodiment of the invention.
Figure 3:
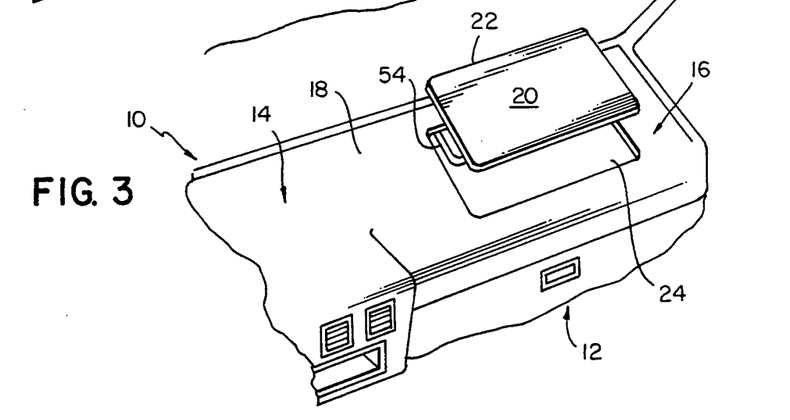
FIG. 3 is a simplified fragmentary perspective view of the interior of the vehicle of FIG. 2 with the closure opened.

Initially referring to FIGS. 1-3, there is generally illustrated a fragmentary view of an automobile 10 and, more specifically, the passenger compartment 12 thereof. The passenger compartment 12 includes an interior trim structure 14 comprising a dashboard 16 having an outer surface 18.

Within the dashboard 16 is contained a rectangular air bag deployment door panel 20 having a perimeter 22, with the door panel 20 formed, as described below, to correspondingly provide closure to a rectangular opening 24 within the dashboard 16.

As will be described in detail below, upon the actuation of an air bag (not shown), the door panel closure 20 opens to permit the air bag to deploy out into the passenger compartment 12, through the opening 24, to cushion a positioned passenger from contact with the interior trim structure 14.

The door panel 20 of the invention renders the entire opening 24 invisible in a smooth expanse of the dashboard surface 18. In this way, the presence of the door panel 20 and the perimeter 22 thereof are invisible or otherwise undetectable upon the viewing thereof by a person within the passenger compartment 12.

As perhaps best viewed by reference to FIG. 2, the dashboard 16 is a multi-layer structure and includes a substrate section 26 and a foam section 30 at least partially overlying the substrate section 26. The substrate section 26 is a structural member portion of the dashboard that provides support for complementary foam and skin sections. The foam section 30, such as of plastic foam such as of polyurethane, results in the dashboard having a more desirable tactile impression, i.e., the dashboard has "a softer feel." Also, such a foam section can provide the dashboard with additional energy adsorption capacity such as may be needed or desired with respect to at least certain types of vehicle collisions in order to more fully protect or cushion the respective occupant. Further, as any imperfection such as bumps or similar surface irregularities on the top side of the substrate can be translated onto an adjoining skin, the inclusion of such a foam section typically provides a smoother, more consistent surface for the adjoining skin and thereby minimizes or eliminates translation of such imperfections to the skin.

The foam section 30 is generally adjacent the substrate section 26 and can be composed of one or more layers of foam material, as desired. In practice, such a foam section is commonly about 10 to 12 mil thick.

The door panel 20 is also a multi-layer structure which includes a substrate portion 32. In this embodiment, the substrate portion 32 is integral with the substrate section 26. Such a one piece construction can significantly simplify production and the costs associated therewith.

A decorative skin layer 34, such as of a thin, flexible plastic sheet, such as of polyvinyl chloride or polyurethane, smoothly overlies the door substrate portion 32 and the foam section 30 overlying the dashboard substrate section 26 such that the outer surface 36 of the skin layer 34 has no visible breaks or seams over the area covered thereby. As such, the existence of the door panel 20 will not be visible to an occupant of the vehicle.

The skin layer 34 is fastened or otherwise joined to the upper surface 40 of the door substrate portion 32. In practice, such a skin layer 34 and door substrate portion 32 can be fastened together such as by means of an adhesive such as multi-component urethanes or epoxies, heat activated polyamide or pressure sensitive-type adhesives, for example, with the skin layer 34 being appropriately spaced from the trim structure substrate section 26 along the balance of the underlying area thereof.

After the skin layer 34 and door substrate portion 32 have been joined together, the selected foam material can be injection molded between the spaced apart skin 34 and the trim structure substrate portion 26 to appropriately fill the space therebetween to provide the desired cushioning feel to the dashboard trim. By such a foaming process, the skin 34 and the substrate 26 are bonded to each other.

In such arrangements, the opening is preferably designed so that the foam section is sealed within the trim structure upon inflation of the air bag and the opening of the door therein. That is, opening of the door does not effect visible tearing or fragmentation of the foam material whereby pieces or fragments of foam material could be ejected for possible contact with a vehicle occupant.

Also, the region of the trim structure substrate 26 that surrounds and is adjacent the opening 24, herein such trim substrate region is specifically identified with the reference character 42, preferably is strong and rigid to facilitate the separation of the door panel from the dashboard trim upon inflation of the air bag without significantly structurally altering the balance of the dashboard trim.

To that end, in this and subsequently described embodiments, in such a trim substrate region 42, e.g., the trim substrate section adjacent the opening formed upon the displacement of the door panel, the trim substrate 26 is curved and no foam is placed between the skin 34 and the trim substrate 26. This curved portion of the trim substrate section adds strength and rigidity to the trim in the vicinity of the opening and as the skin is directly joined to the substrate in the vicinity of the opening, the trim foam section is sealed from the opening, thereby effectively precluding fragmentation of the trim foam section 30 upon the opening of the door 20.

It will be appreciated that the periphery of the door panel can include breaklines, such as in the form of indentations, to facilitate the separation of the door panel from the dashboard trim upon inflation of the air bag. That is, the breaklines are adapted to break under the influence of inflating of the air bag to define the opening.

In this illustrated embodiment, the skin layer includes a frangible seam that outlines the door panel periphery 22. Such a frangible seam can, for example, be in the form of an indentation 44 in the skin surface 46, i.e., that surface of the skin layer 34 adjacent the door panel substrate portion 32. Further, such an indentation can, if desired, be formed into the skin such as during the injection molding formation of the skin. In this way the indentation can be integrally formed in the skin as a part of the initial production thereof rather than requiring the later formation of an indentation in a previously formed skin. By using integrally formed indentations rather than retrofitting indentations in a preexisting skin material, a more consistent and uniform indentation, e.g., an indentation of greater uniformity in depth and width, can be produced. The utilization of such an indented skin layer can beneficially allow for more consistent and controlled tearing of the skin layer, not only at ambient temperatures but also at elevated and reduced temperatures to which such assemblies are commonly subjected.

In this illustrated embodiment, the door panel substrate portion 32 and the trim substrate section 26 are of a one piece construction, which includes a breakline that outlines the door panel periphery. Such a breakline can, for example, be in the form of an indentation 48 in the substrate surface 50, i.e., that planar surface of the substrate 26 opposite the skin 34. Further, as with the indentation 44 in the skin 46, the substrate indentation 48 can, if desired, be formed in the substrate 26 such as during the injection molding formation thereof. In this way the indentation can be integrally formed in the substrate as a part of the initial production thereof rather than requiring the later formation of an indentation in a previously formed substrate. Again, by using integrally formed indentations rather than retrofitting indentations in a preexisting substrate material, a more consistent and uniform indentation, e.g., an indentation of greater uniformity in depth and width, can be produced. The utilization of such an indented substrate can beneficially allow for more consistent and controlled tearing of the substrate, again not only at ambient temperatures but also at elevated and reduced temperatures to which such assemblies are commonly subjected.

While it will be generally preferred to include breaklines or indentations in both the skin and substrate, it is to be understood that the invention can be practiced without the inclusion of such breaklines or indentations in either the skin, the substrate or both.

Underlying the door panel 20 lies a reaction canister 52 wherein is housed a folded uninflated air bag (not shown) for later deployment. Upon deployment of the air bag, the inflating air bag exerts opening pressure against the door panel resulting in the door panel becoming separated from dashboard trim structure, e.g., the door panel substrate portion detaches from the trim substrate section and the skin overlying the door substrate portion detaches from the balance of the skin.

In addition, upon the opening of the closure, the separated door panel is preferably secured within the vehicle in a fashion which prevents undesired contact of the occupant by the separated door. To that end, a tether 54, such as a strip of elastic material, such as of nylon or polyester, extends between the door panel 20 and the reaction canister 52. The tether 54 is shown as joined to the sidewall 56 of the reaction canister 52 and the door panel substrate portion 32 by means of rivets 62a and 62b, respectively. For example, a tubular or solid type of rivet fabricated of steel or aluminum can be used.

It is to be understood, however, that in this as well as other embodiments of the invention wherein a tether is used in securing the door panel to or within the vehicle assembly upon air bag deployment, the point of joinder of the tether to the door panel and the vehicle assembly, e.g., the reaction canister, and the means by which such joinder are not limitations to the practice of the invention in its broader aspects. Thus, other appropriate means of joinder such as inmolding of the tether to the door substrate, heat staking the tether to the door substrate, adhering or gluing the tether to the door substrate and/or the reaction canister, use of screw fasteners, looping the tether through a slot in the canister and/or the door substrate and sewing the tether to itself to form a loop about the respective portion of the canister or door, for example, can be used, if desired.

Further, as an alternative to joinder to the outside of the upper side of the reaction canister, the non-door panel end of the tether can be joined to other appropriately situated stable and fixed components within the vehicle.

Figure 4:
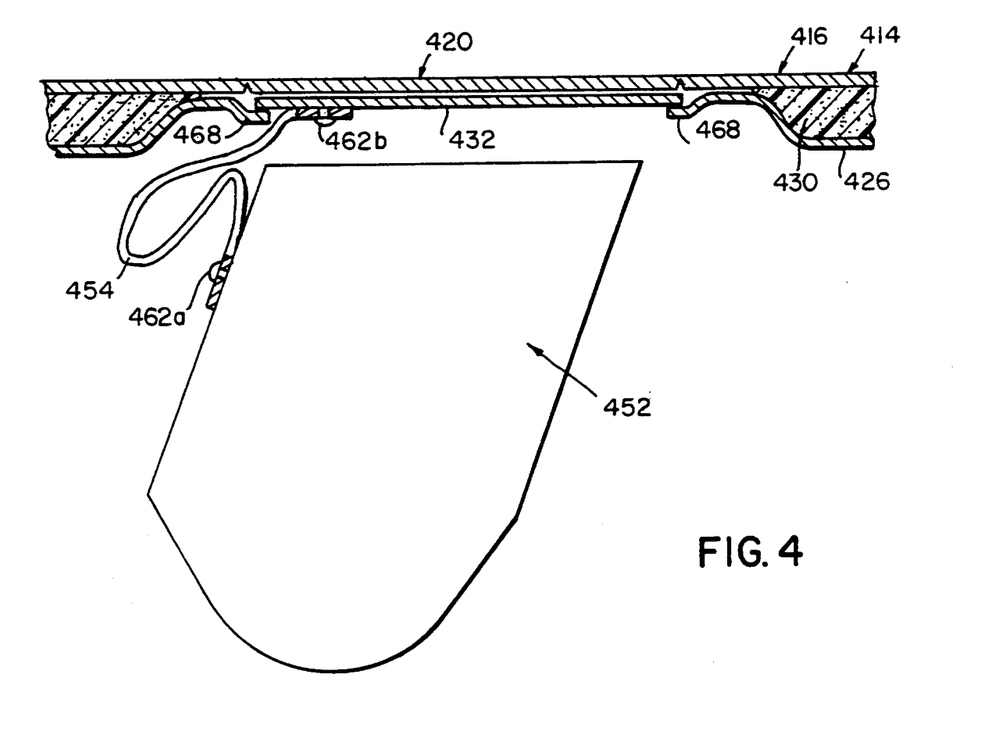
FIG. 4 is a simplified fragmentary cross sectional view, similar to FIG. 2, illustrating an alternative embodiment of the invention.

Referring to FIG. 4, there is illustrated an alternative embodiment of the invention wherein the presence of a door panel 420 is invisible or otherwise undetectable upon the viewing thereof by a person within the passenger compartment.

Similar to the embodiment illustrated in FIG. 1-3 and described above, FIG. 4 illustrates an interior trim structure 414 comprising a dashboard 416. The door panel 420 permits the air bag (not shown) to deploy from a reaction canister 452 into the passenger compartment to cushion a positioned passenger from contact with the interior trim structure 414.

Again, the dashboard 416 is a multi-layer structure and includes a substrate section 426 and a foam section 430 at least partially overlying the substrate section 426.

Also, a tether 454 secured by rivets 462a and 462b extends between the door panel 420 and the reaction canister 452 to ensure that door panel 420 remains properly secured within the vehicle upon bag deployment.

This embodiment differs from that illustrated in FIG. 1-3 and described above, however, in that the door panel substrate portion 432 is separate from the trim substrate section 426, i.e., the door panel substrate is non-continuous with the trim substrate.

In this embodiment, the trim substrate section 426 adjacent the door panel 420 includes an extending shoulder 468, supporting the door panel 420.

As the size of the opening in the dashboard substrate is not dictated by the tearing or breaking of the substrate, such an arrangement can beneficially provide a more consistently and uniformly dimensioned opening in the substrate through which the air bag can deploy.

Figure 5:
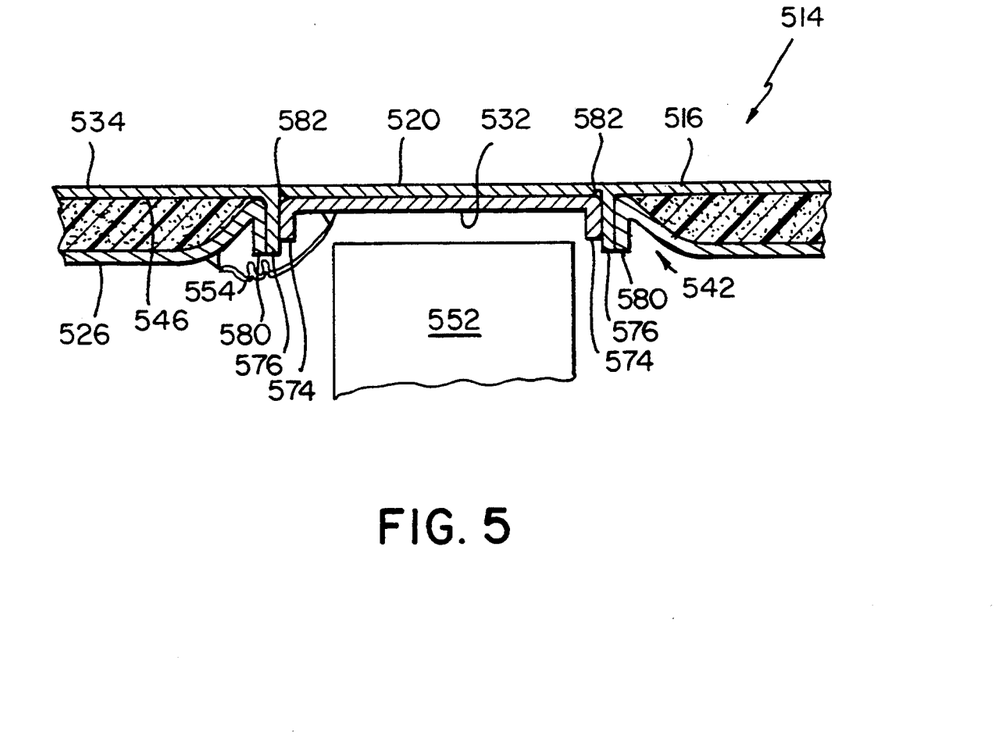
FIG. 5 is a simplified fragmentary cross sectional view, similar to FIG. 2, illustrating another embodiment of the invention.

Referring to FIG. 5, there is illustrated another alternative embodiment of the invention. Again, similar to the embodiment illustrated in FIG. 1-3 and described above, FIG. 5 illustrates an interior trim structure 514 comprising a dashboard 516. A door panel 520 is provided within the dashboard 516 to permit an air bag (not shown) to deploy from a reaction canister 552 into the passenger compartment to cushion a positioned passenger from contact with the interior trim structure 514.

Also, a tether 554 extends between the door panel 520 and the dashboard substrate section 526 to ensure that door panel 520 remains properly secured within the vehicle upon bag deployment.

Again, the door panel substrate 532 is separate from the trim substrate section 526, i.e., the door substrate portion 532 is non-continuous with the trim substrate section 526. Moreover, if desired, the door panel substrate portion 532 can be formed to include a downward extending flange 574 about the periphery thereof.

The incorporation of such a flange allows a more consistent alignment of the door substrate with the surrounding dashboard substrate and, thus, a more consistent appearance to the skin surface. Also, the incorporation of such flanges can increase the rigidity of the door to thereby reduce distortion and provide a more consistent tearing load on the skin surface overlying the periphery of the door.

In this embodiment, the skin 534 of the dashboard 516 includes a flange 576 downward extending from the skin side 546, e.g., that side of the skin 534 adjacent the door panel substrate 532. The flange 576 is integral with the skin 534 as the skin with flange is formed as one piece and extends generally perpendicular to the planar dashboards 516.

The trim substrate region 542, i.e., the trim substrate section 526 adjacent the door panel 520, is formed to include collar portions 580. The collar portions 580 are generally perpendicular to the plane formed by the door substrate portion 532.

The flange 576 is joined to the trim substrate collar portion 580 such as by means of an adhesive such as of the type identified above.

The skin 534 includes a frangible seam 582 outlining the opening formed upon opening of the closure. The frangible seam 582 is formed in the skin surface 546 outlining the periphery of the door panel 520.

The inclusion of such a frangible seam provides for a more consistent and controlled tearing of the skin layer not only at ambient temperatures but also at elevated and reduced temperatures to which such assemblies are commonly subjected.

Figure 6:
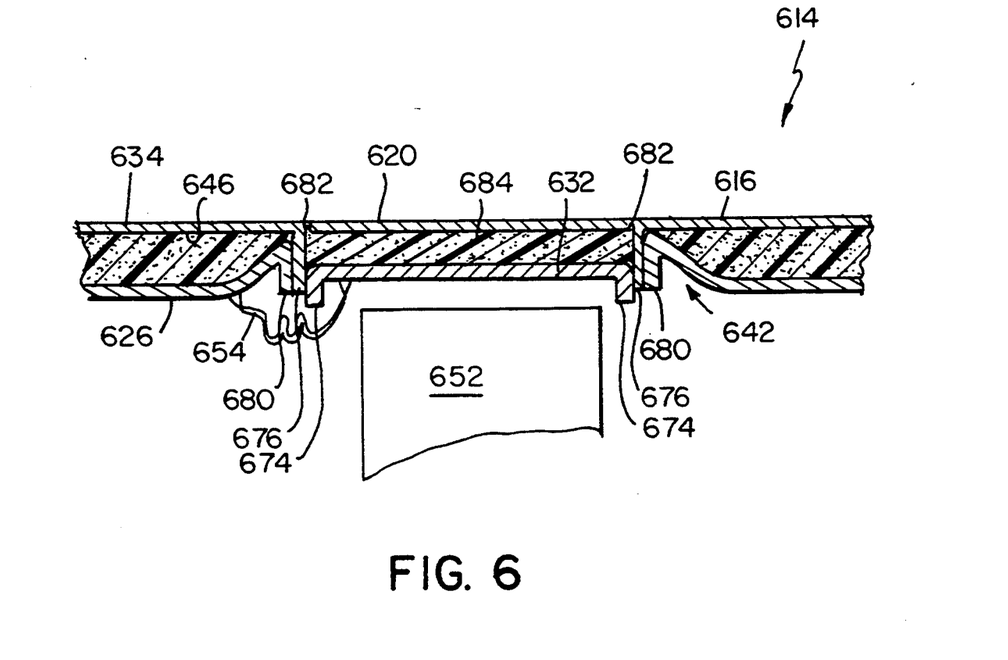
FIG. 6 is a simplified fragmentary cross sectional view, similar to FIG. 2, illustrating still another embodiment of the invention.

FIG. 6 illustrates an arrangement similar to that of FIG. 5 and showing an interior trim structure 614 comprising a dashboard 616 with a door panel 620 provided therein to permit the air bag (not shown) to deploy from a reaction canister 652 into the passenger compartment to cushion a positioned passenger from contact with the interior trim structure 614.

Also, a tether 654 extends between the door panel 620 and the dashboard substrate section 626 to ensure that door panel 620 remains properly secured within the vehicle upon bag deployment.

As with the previously described embodiment, the trim structure 614 includes a skin 634 having a downward extending flange 676 downward extending from the skin side 646, e.g., that side of the skin 634 adjacent the door panel substrate 632. The flange 676 is integral with the skin 634 as the skin with flange is formed as one piece and extends generally perpendicular to the planar dashboard 616. The flange 676 is joined to a trim substrate collar portion 680, generally perpendicular to the plane formed by the door substrate portion 632.

Also, the skin 634 includes a frangible seam 682 outlining the opening formed upon opening of the closure. The frangible seam 682 is formed in the skin surface 646 outlining the periphery of the door panel 620.

The door panel 620 of FIG. 6, however, includes a foam portion 684 interposed between the door panel substrate portion 632 and the overlying skin 634.

The inclusion of such a foam portion 684 can result in the arrangement having a more uniform appearance and provide a more uniform tactile impression over the expanse of the dashboard including the segment wherein the deployment opening is to be produced. That is, minimize the appearance and tactile impression of the presence of the underlying deployment opening.

In one embodiment of such an arrangement, consistency between the trim structure and the door panel in characteristics such as those relating to aging as well as those relating to softness or feel can be enhanced by injection molding the door foam portion while simultaneously also injection molding foam between the skin and the trim substrate section. In this way, injection molding foam from the same batch or mixture can be used for both the trim foam section and the door foam portion.

In a second embodiment of this modification, the door panel foam portion is formed by implanting a piece of pre-cut foam between the door panel substrate portion and the overlaying skin. As such an embodiment can eliminate the need for the difficult process of injection molding through multiple ports that are in close proximity, the use of a pre-cut foam section can simplify and reduce the cost of production as compared to the above-described embodiment wherein foam for the door panel and the trim structure are simultaneous injection molded from the same batch. Further, the use of such a pre-cut foam section for the door panel can desirably reduce or eliminate the likelihood of foam fragmentation about the periphery of the door panel upon separation thereof from the trim structure.

Figure 7:
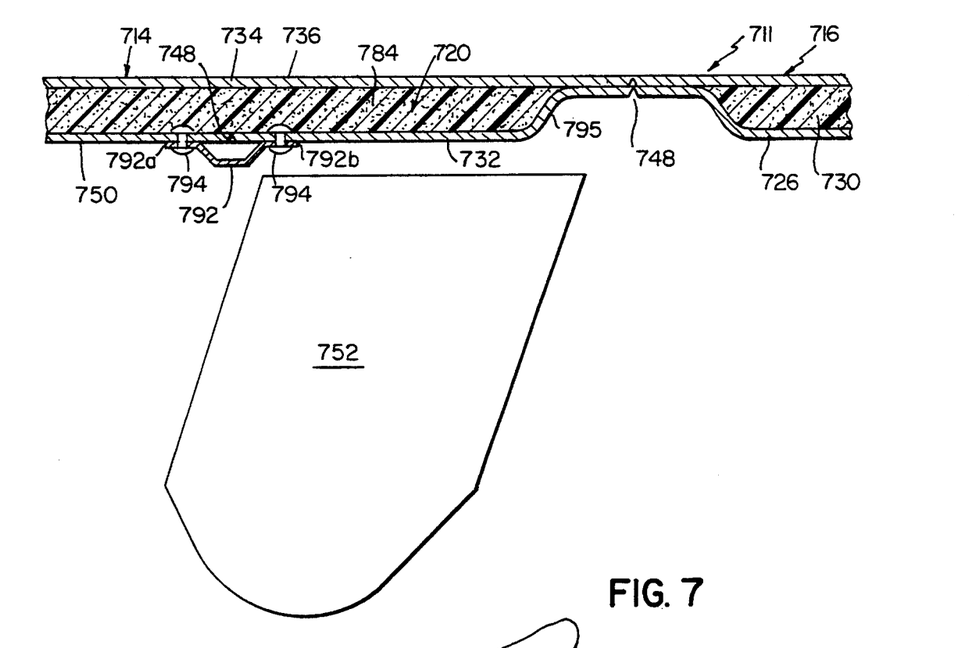
FIG. 7 is a simplified fragmentary cross sectional view similar to FIG. 2 illustrating yet still another embodiment of the invention.
Figure 8:
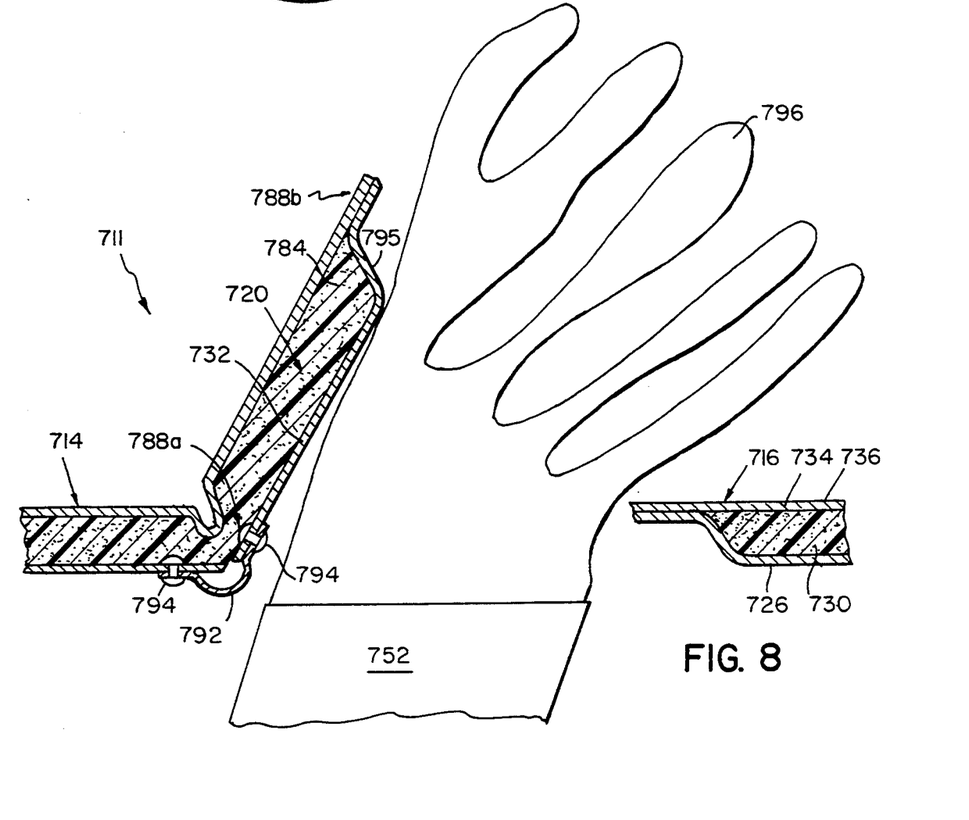
FIG. 8 is a simplified fragmentary cross sectional view similar to FIG. 7 and illustrating the embodiment of FIG. 7 but with the closure opened and the air bag deploying through the opening resulting upon the opening thereof.
Figure 9:
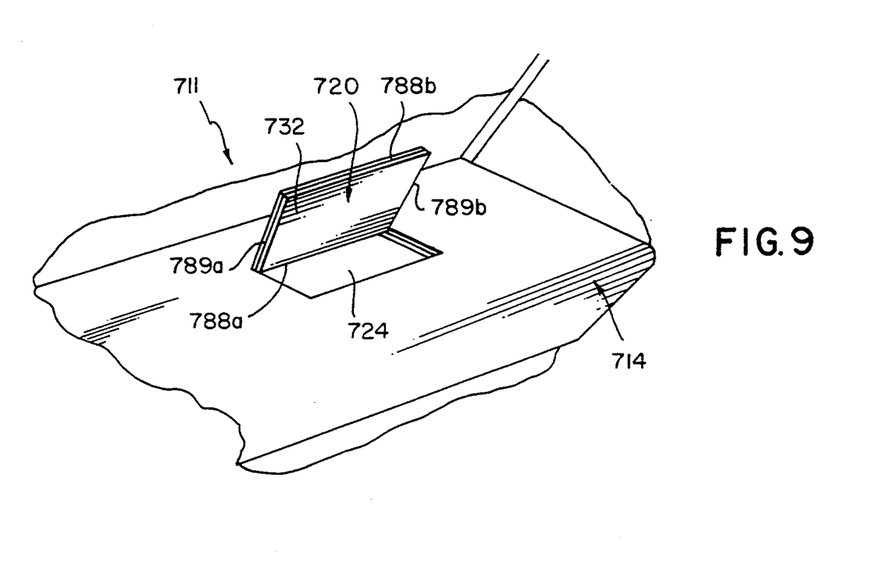
FIG. 9 is a simplified fragmentary perspective view of the interior of the vehicle of FIGS. 7 and 8 with the closure opened.

FIGS. 7–9 illustrate an arrangement 711 for providing an opening in an interior trim structure 714 of an automotive vehicle for the deployment of an air bag therethrough wherein a door panel 720 is formed. As described in greater detail below, the door panel 720, while remaining joined with the trim structure 714, hinges open to form an air bag deployment opening 724.

In this embodiment a dashboard 716 again is a multilayer structure and includes a substrate section 726 and a foam section 730, at least partially overlying the substrate section 726. Integral and formed in one piece with the trim substrate section 726 is a door panel substrate portion 732. It is to be understood, however, that the substrate for the door can, if desired and such as described above, be formed as a piece separate and apart from the trim substrate section.

As in the above-described embodiments, a skin 734 overlies the dashboard foam section 730 and the door panel substrate portion 732 such that the outer surface 736 of the skin layer 734 has no visible breaks or seams over the area covered thereby.

In the illustrated embodiment, the rectangular shaped hinged door panel 720 includes first and second opposed longitudinal sides, 788a and 788b, respectively, and first and second opposed lateral sides 789a and 789b, respectively.

As with the embodiment illustrated in FIGS. 1–3 and described above, the door panel substrate portion 732 and the trim substrate section 726 are of a one piece construction, which includes a breakline that outlines the door panel periphery. Such a breakline can, for example, be in the form of an indentation 748 in the substrate surface 750, i.e., that surface of the substrate 726 opposite the skin 734. As described above, the substrate indentation 748 can, if desired, be formed in the substrate 726 such as during the injection molding formation thereof.

The door panel 720 includes a door panel foam portion 784 which is continuous along longitudinal side 788a with the trim section foam section 730. Spanning across the substrate indentation 748 along the hinge longitudinal side 788a is a hinge bracket 792, secured at opposed first and second ends 792a and 792b, respectively, to trim substrate 726 and the door panel substrate 732, respectively, with rivets 794. Such rivets and brackets can commonly be made of metal materials such as steel, aluminum, or magnesium, for example.

As with the trim substrate in the area adjacent the opening 724, the door panel substrate 732, except along the hinge side 788a (which side remains joined with the trim upon opening), is curved and no foam is placed between the skin and the substrate, such curved portion is designated by the reference numeral 795. The curved portion 795 adds strength and rigidity to the door panel 720 in the vicinity of the opening 724 and as the skin 734 is directly joined to the substrate 732 thereat, the door panel foam portion 784 is sealed from the opening 724, thereby effectively precluding fragmentation of the door panel foam upon the opening of the door.

Thus, upon system actuation, an air bag 796 is deployed from the reaction canister with the force of the deploying air bag pressing against the door panel substrate 732 effecting breaks along the breaklines outlining the door panel 720 with the door panel hinging open about the longitudinal side 788a, by way of the hinge bracket 792, to permit the air bag 796 to deploy through the resulting opening 724.

With such an arrangement, as the number of sides at which tearing of the substrate, foam, and/or skin occurs is reduced, the potential for fragmentation of the substrate, foam, and/or skin and the dangers and risks associated therewith, e.g., inadvertent contact with the vehicle occupant, are also reduced.

Such an arrangement can also reduce the amount of area which underlies the skin which does not include foam, or other softening material, between the skin and the substrate. As a result, such an arrangement can beneficially further reduce the visual and/or tactile impression of the presence of the deployment closure/door and the opening associated therewith.

In practice, such arrangements for providing an opening in an interior trim structure of an automotive vehicle for the deployment of an air bag therethrough can use materials such as cast or injection molded polyvinyl chloride (PVC) or urethane of a thickness of about 1–1.5 mil, for example, for the skin material.

Also, interior trim/dashboard substrates are commonly manufactured of injection molded materials such as acrylonitrile-butadiene-styrene copolymer (i.e., ABS) resin or polycarbonate plastic, for example, and are commonly manufactured 3–4 mil thick. It will be appreciated that, if desired, other materials can be used. For example, if the maintaining of structural properties such as flex modulus over a broad range of temperatures is a concern, an engineering grade thermoplastic such as a thermoplastic polyolefin (i.e., a "TPO") or a thermoplastic polyester (i.e., a "TPE") can be used.

It will also be appreciated that in those embodiments wherein the door panel substrate is separate from the trim substrate, the door panel substrate can be manufactured from a different material than that used for the trim substrate, dependent on the desired properties and cost considerations. Thus, for example, the door panel substrate can be manufactured using an engineering grade thermoplastic while trim substrate can be manufactured using the more conventional materials such as ABS resin or polycarbonate plastic, for example.

While in the illustrated embodiments, the rectangular door panels and openings have widths that exceed their height, it will be of course appreciated that the invention is not so limited. Thus, the invention has applicability to other geometries of door panels and openings including square, oval, round, as well as rectangular door panels and openings wherein the height exceeds the width, for example.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. An arrangement for providing an opening in an interior trim structure of an automotive vehicle for the deployment of an air bag therethrough, the interior trim structure including a substrate section and a foam section, with the foam section at least partially overlaying the substrate section, said arrangement comprising:
    at least one door panel including a substrate portion, said door panel providing closure to said opening prior to air bag deployment, and
    a skin smoothly overlaying the trim structure foam section and said door substrate portion rendering the opening invisible prior to deployment of the air bag through the opening, said skin being at least in part directly fastened to said door substrate portion.

2. The arrangement of claim 1 wherein said door panel substrate portion is continuous with said interior trim structure substrate section and formed by injection molding processing having a breakline about the periphery thereof, said breakline adapted to break under the influence of inflating of the air bag to define said opening.

3. The arrangement of claim 2 wherein said door panel substrate portion includes a side adjacent said air bag and wherein said breakline is formed by an indentation in said air bag adjacent side of said door panel substrate portion, said indentation being integrally formed therein during the injection molding processing.

4. The arrangement of claim 1 wherein said door panel substrate portion is non-continuous with said interior trim structure substrate section.

5. The arrangement of claim 1 wherein said skin includes a frangible seam outlining said opening, said frangible seam comprising an integrally formed indentation in the surface of said skin adjacent said door substrate portion.

6. The arrangement of claim 1 wherein upon deployment of the air bag said skin smoothly overlaying the trim structure foam section detaches at least in part from said skin smoothly overlaying said door substrate portion and said door panel is tethered in the vehicle.

7. An arrangement for providing an opening in an interior trim structure of an automotive vehicle for the deployment of an air bag therethrough, the interior trim structure including a substrate section and a foam section, with the foam section at least partially overlaying the substrate section, said arrangement comprising:
    at least one door panel including a substrate portion, said door panel providing closure to said air bag deployment opening prior to air bag deployment, and
    a skin smoothly overlaying the interior trim structure and said door panel rendering the opening invisible prior to deployment of the air bag through the opening, said skin having a side proximate to the interior trim structure foam section and said door panel, said skin including at least one integral flange extending from said proximate side adjacent the periphery of said door panel, said flange being joined to the interior trim structure substrate section, the interior trim structure foam section comprising foam injection molded between said skin and the interior trim structure substrate section with said flange preventing passage of said interior trim structure injected foam onto said door panel substrate portion.

8. The arrangement of claim 7 wherein said skin and said door panel substrate portion are joined together by adhesion.

9. The arrangement of claim 7 wherein said door panel additionally includes a foam portion interposed between at least a segment of said door panel substrate portion and said overlaying skin.

10. The arrangement of claim 9 wherein said door panel foam portion is formed by injection molding foam between said door panel substrate portion and said overlaying skin.

11. The arrangement of claim 9 wherein said door panel foam portion comprises a piece of pre-cut foam between said door panel substrate portion and said overlaying skin.

12. The arrangement of claim 7 wherein said skin includes a frangible seam outlining said air bag deployment opening, said frangible seam comprising an integrally formed indentation in the surface of said overlaying skin proximate to said door panel.

13. An arrangement for providing an opening in an interior trim structure of an automotive vehicle for the deployment of an air bag therethrough, the interior trim structure including a substrate section and a foam section, with the foam section at least partially overlying the substrate section, said arrangement comprising:

at least one door panel providing closure to said air bag deployment opening prior to air bag deployment, said door panel including a substrate portion and a foam layer portion at least partially lying over and on said door panel substrate portion, said door panel, said door panel foam layer portion and said door panel substrate portion each having at least a first, a second, and a third side, with the first side of said door panel foam layer portion being continuous with the interior trim structure foam section, with at least the second and third sides of said door panel foam layer portion being non-continuous with the interior trim structure foam section, the first side of said door panel forming a hinge to enable said door panel to hinge open and form said air bag deployment opening, and a skin smoothly overlaying the interior trim structure foam section and said door panel foam layer portion, said skin being adhered to said door panel substrate portion at least at the second and third sides of said door panel.

* * * * *